(12) United States Patent
Guo et al.

(10) Patent No.: US 9,304,689 B2
(45) Date of Patent: Apr. 5, 2016

(54) MODELING WORKLOAD INFORMATION FOR A PRIMARY STORAGE AND A SECONDARY STORAGE

(71) Applicant: INTERNATIONAL BUSINESS MACHINES CORPORATION, Armonk, NY (US)

(72) Inventors: Yong Guo, Shanghai (CN); Jun Tao Li, Shanghai (CN); Yan Xu, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

(21) Appl. No.: 14/228,239

(22) Filed: Mar. 27, 2014

(65) Prior Publication Data

US 2015/0277762 A1   Oct. 1, 2015

(51) Int. Cl.
*G06F 12/00* (2006.01)
*G06F 3/06* (2006.01)

(52) U.S. Cl.
CPC .............. *G06F 3/061* (2013.01); *G06F 3/0653* (2013.01); *G06F 3/0683* (2013.01)

(58) Field of Classification Search
CPC ......... G06F 3/06; G06F 3/0604; G06F 3/061; G06F 3/0683; G06F 3/0653

USPC .................................................. 711/154, 170
See application file for complete search history.

(56) References Cited

U.S. PATENT DOCUMENTS

| 8,473,459 | B2 | 6/2013 | Chiu et al. |
| 8,566,546 | B1 * | 10/2013 | Marshak et al. .............. 711/165 |
| 8,949,483 | B1 * | 2/2015 | Martin ............................ 710/16 |
| 2011/0208941 | A1 * | 8/2011 | Gill et al. ...................... 711/170 |
| 2012/0272030 | A1 | 10/2012 | Jennas, II et al. |

* cited by examiner

*Primary Examiner* — Pierre-Michel Bataille
(74) *Attorney, Agent, or Firm* — David W. Victor; Konrad Raynes Davda & Victor LLP

(57) ABSTRACT

Provided are a computer program product, system, and method for modeling workload information for a primary storage and a secondary storage. A determination is made of: a first type and second type of Input/Output (I/O) operations with respect to extents configured in the primary storage; a cumulative I/O workload for the primary storage based on a first type and a second type of I/O operations at different cumulative storage amounts of the primary storage indicating a concentration of the I/O workload on the primary storage; and cumulative I/O workload for the secondary storage based on the first type and the second type of I/O operations at different storage amounts indicating a concentration of the I/O workload of the first type of I/O operations on the secondary storage. A performance gap is determined based on the cumulative I/O workloads for the primary and secondary storages at one of the storage amounts.

20 Claims, 8 Drawing Sheets

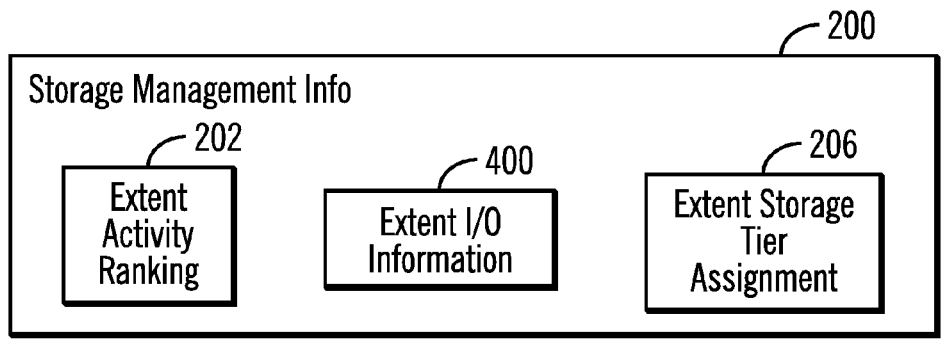
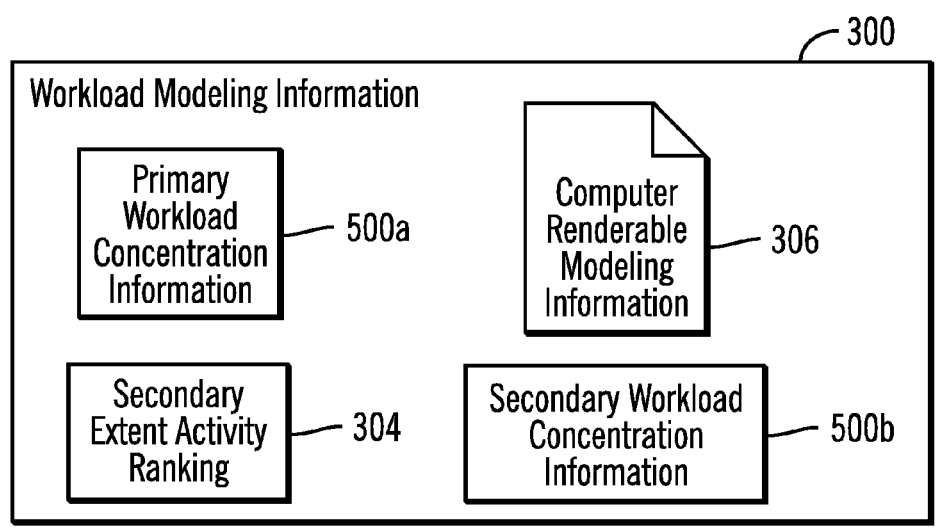
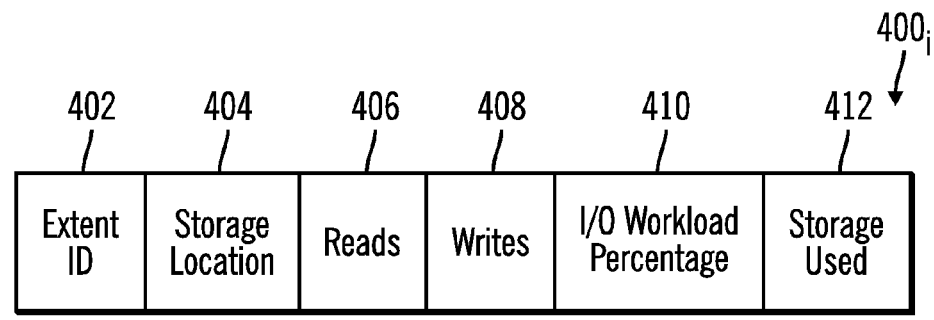
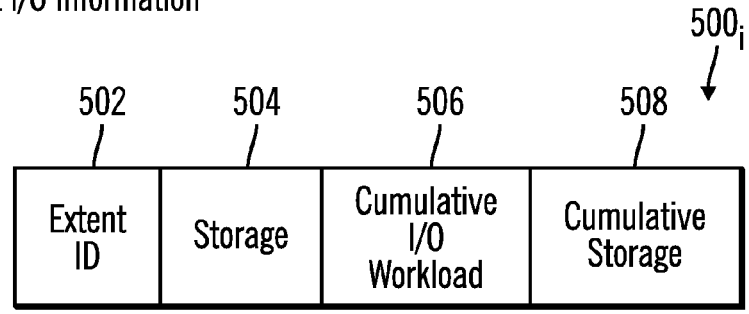

Primary Storage Information

|  | e1 | e2 | e3 |
|---|---|---|---|
| Read | 25 | 5 | 0 |
| Write | 5 | 15 | 10 |
| Accumulative Total IO Percentage | 50% | 83.3% | 100% |

Secondary Storage Information

|  | e2 | e3 | e1 |
|---|---|---|---|
| Read | 5 | 0 | 25 |
| Write | 15 | 10 | 5 |
| Accumulative Total IO Percentage | 33.3% | 50% | 100% |

Y - Accumulative Total IO Percentage
X - Top x most intensive data sorted either based on total IO or write IO

MODELING WORKLOAD INFORMATION FOR A PRIMARY STORAGE AND A SECONDARY STORAGE

BACKGROUND OF THE INVENTION

1. Field of the Invention

The present invention relates to a computer program product, system, and method for modeling workload information for a primary storage and a secondary storage.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage. Different copy technologies may be used for maintaining remote copies of data at a secondary site, such as International Business Machine Corporation's ("IBM") Extended Remote Copy (XRC), Coupled XRC (CXRC), Global Copy, Metro Mirror (MM), and Global Mirror Copy. In data mirroring systems, data is maintained in volume pairs. A volume pair is comprised of a volume in a primary storage device and a corresponding volume in a secondary storage device that includes an identical copy of the data maintained in the primary volume. Primary and secondary control units, also known as storage controllers or enterprise storage servers, may be used to control access to the primary and secondary storage devices. In data mirroring copy operations, multiple primary control units may have source/target pairs, i.e., volume pairs, included in consistency groups so that data copied to target volumes by the different primary control units maintains data consistency.

When establishing a mirror copy relationship, the administrator may set up copy relationship between volumes in a session that may be grouped according to Logical Subsystem (LSS), where there may be multiple LSSs, each grouping multiple volumes, and where the LSSs are assigned to one session. Data consistency may be maintained among the mirror copy operations between the volumes in the LSSs assigned to a session.

In current mirror copy arrangements where multiple volumes in volume groups are being mirrored to a remote storage site location, certain volumes or LSSs may experience relatively high levels of I/O activity and updates which can cause delays that lead to suspensions and performance degradation. If the administrator notices that the workload is not properly balanced among the LSSs, then the administrator may move volumes among sessions and LSSs to balance the workload.

The Easy Tier application offered by International Business Machines Corporation ("IBM") migrates extents of frequently accessed data from hard disk drive storage to a solid state storage device (SSD), which has faster access than the disk drives. The Easy Tier application monitors Input/Output (I/O) workload to extents of data, such as 1 Gigabyte (GB) units, and if the workload or activity with respect to the extent reaches a certain threshold, then the Easy Tier application migrates the extent to the SSD where access times are improved. In this way, "hot extents", those frequently accessed, are migrated to the SSD, while "cold extents", those deemed less frequently accessed, are migrated from the SSD to the hard disk drives.

SUMMARY

Provided are a computer program product, system, and method for modeling workload information for a primary storage and a secondary storage. A determination is made of a first type and second type of Input/Output (I/O) operations with respect to extents configured in the primary storage. A determination is made of cumulative I/O workload for the primary storage based on a first type and a second type of I/O operations at different cumulative storage amounts of the primary storage indicating a concentration of the I/O workload on the primary storage, wherein the primary storage includes multiple storage tiers. A determination is made of cumulative I/O workload for the secondary storage based on the first type and the second type of I/O operations at different storage amounts indicating a concentration of the I/O workload of the first type of I/O operations on the secondary storage, wherein the secondary storage includes multiple storage tiers. A performance gap is determined based on the cumulative I/O workloads for the primary and secondary storages at one of the storage amounts. Information on the determined performance gap is generated.

BRIEF DESCRIPTION OF THE DRAWINGS

FIG. 2 illustrates an embodiment of storage management information.

FIG. 3 illustrates an embodiment of workload modeling information.

FIG. 4 illustrates an embodiment of extent I/O information.

FIG. 5 illustrates an embodiment of workload concentration information.

DETAILED DESCRIPTION

Described embodiments provide techniques to determine workload I/O concentration at different cumulative storage capacity for a primary and secondary storages. A chart or other graphic representation of the workload I/O concentration between the primary and secondary storages is generated to allow determination of gaps in the workload I/O concentration for the primary and secondary storages at different cumulative storage capacity. In certain embodiments, the primary storage workload I/O concentration may be based on read and write operations to extents in the primary storage sorted according to read and write I/O activity and the secondary storage workload I/O concentration may be based on write operations to the primary storage, which are mirrored to the secondary storage.

Figure 1:
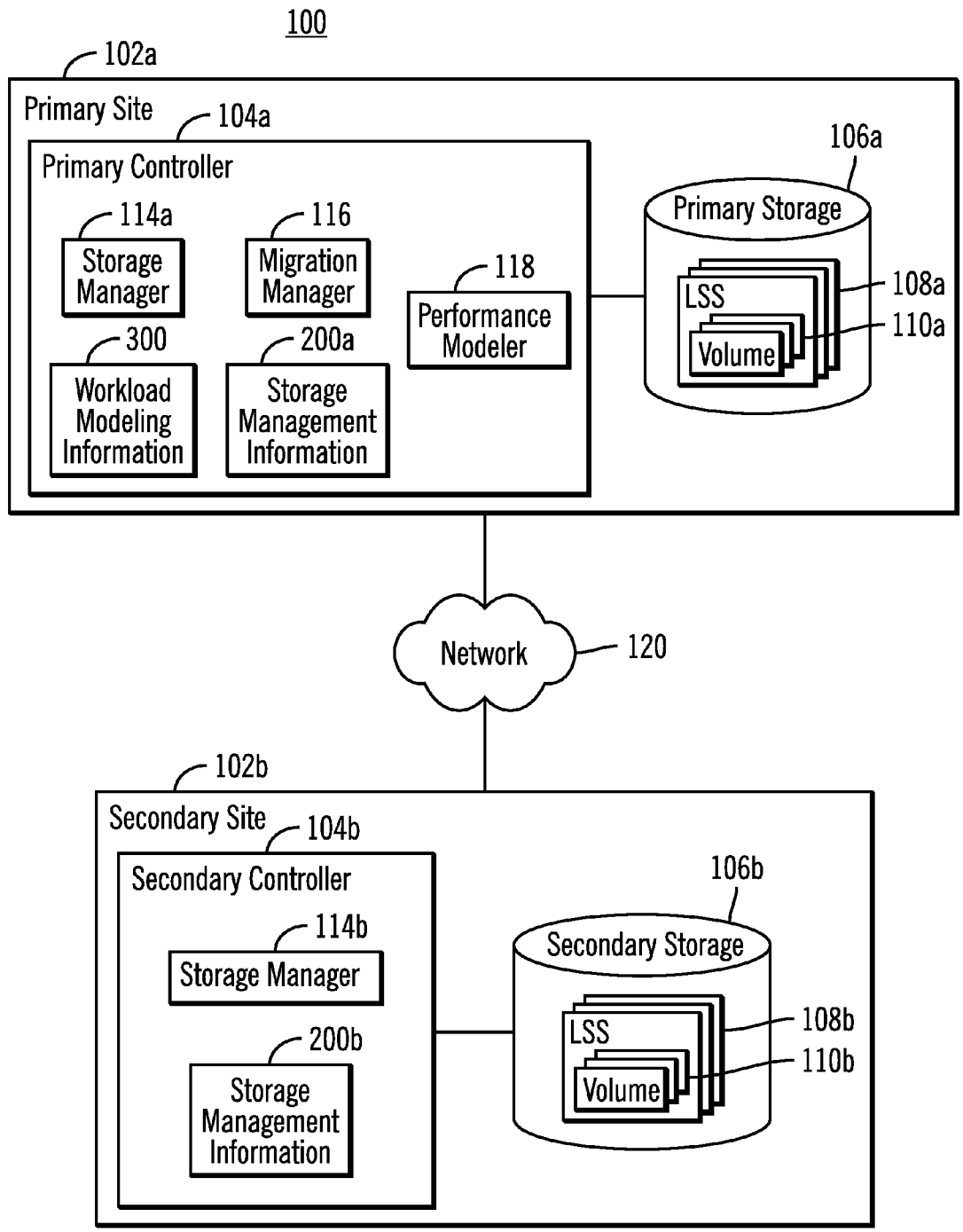
FIG. 1 illustrates an embodiment of a storage environment.

FIG. 1 illustrates an embodiment of a storage environment 100 having a primary site 102a and a secondary site 102b, where the secondary site 102b provides a remote site backup of volumes and data at the primary site 102a. One or more primary controllers 104a at the primary site 102a manage primary storages 106a each having one or more logical subsystems (LSSs) 108a providing a grouping of one or more volumes 110a, which each volume 110a stores a plurality of extents of data. The primary controller 104a mirrors the volumes 110a in their LSSs 108a to a secondary controller 104b at the secondary site 102b over a network 120 to store in secondary volumes 110b in LSSs 108b at the secondary storage 106b at the secondary site 102b. In this way, there is a mirror relationship between primary site 102a volumes 110a and secondary site 102b volumes 110b. The primary controller 104a may implement the mirror relationship may by copying all writes to extents in the volumes 110a to the secondary controller 104b to store in the secondary storage 106b.

The primary controller 104a includes a storage manager 114a for managing the transfer of data transferred between hosts (not shown) and the primary storage 106a and a migration manager 116 for managing the migration of data from the primary storage 106a to the secondary controller 104b to store on the secondary storage 106b so that the secondary storage 106b mirrors the data in the primary storage 106a. In this way, writes to the primary storage 106a may be transferred to the secondary controller 104b to write to the secondary storage 106b. The secondary controller 104b also includes a storage manager 114b for managing the storage of data from the primary controller 104a and transfer of data with respect to hosts (not shown) to the secondary storage 106b.

Data in the storages 106a, 106b may be stored in data units configured in the storages 106a, 106b, such as a track, Logical Block Address (LBA), etc., which may be part of a larger grouping of data, such as a volume, logical device, etc. The storage managers 114a, 114b may further include a cache manager (not shown) for caching read and write between the primary storage 106a and the hosts. The storage managers 114a, 114b may configure extents in their respective storages 106a, 106b, where each extent is assigned blocks or tracks of data in the storages 106a, 106b.

The storages 106a and 106b may store data in a Redundant Array of Independent Disks (RAID) configuration. The storages 106a and 106b may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The network 120 may comprise one or more networks, such as one or more interconnected Local Area Networks (LAN), Storage Area Networks (SAN), Wide Area Network (WAN), peer-to-peer network, wireless network, etc.

The storage managers 114a, 114b may manage the storage in extents on different storage tiers configured in the storages 106a, 106b, where each storage tier is associated with a level of storage performance. A highest performance storage tier may have the highest performing storage devices, e.g., SSDs or EEPROM, a middle performance tier may have a middle level performing storage devices, e.g., fast access hard disk drives, and a lowest performance storage tier may have the lowest performing storage devices, e.g., slower access hard disk drives, tape, etc. The storage managers 114a, 114b may migrate extents from one storage tier to another based on their level of access, so the most frequently accessed extents are stored in the highest storage tier and less frequently accessed extents are moved to one of the lower storage tiers commensurate with their level of activity.

The storage managers 114a, 114b maintain storage management information 200a, 200b to manage the storage of extents in storage tiers configured in the storages 106a, 106b.

The primary controller 104a also includes a performance modeler 118 to model the performance characteristics and I/O workload at the primary 106a and secondary 106b storages to present performance modeling information to an administrator to use to determine whether to alter the allocation of storage devices to the storage tiers. Further, the performance modeler 118 maintains workload modeling information 300 having information on the workload at the primary 106a and secondary 106b storages for use in modeling the workload.

The storage manager 114a, 114b, migration manager 116, and performance modeler 118 are shown in FIG. 1 as program code loaded into a memory and executed by a processor complex. Alternatively, some or all of the functions may be implemented in hardware devices in the controller 104a, 104b, such as in Application Specific Integrated Circuits (ASICs).

FIG. 2 illustrates an embodiment of storage management information 200, such as the storage management information 200a, 200b, as including extent activity ranking 202 that ranks each of the extents in the storage according to their activity; extent I/O information 400 having information on the I/O activity at each extent; and an extent storage tier assignment 206 that indicates the storage tier to which each extent is assigned, such that the extent is stored on the indicated storage tier in the storage 106a, 106b in which the extents are stored. In one embodiment, the primary extent activity ranking for extents in the primary storage 106a are ranked according to both read and write I/O activity, from an extent having the highest read and write activity to a lowest.

FIG. 3 illustrates an embodiment of the workload modeling information 300 as including a secondary extent activity ranking 304 indicating a ranking of the extents in the secondary storage 106b according to amount activity or accesses of the extents; a primary workload concentration information 500a providing the workload concentration for extents in the primary storage 106a; and secondary workload concentration information 500b providing the workload concentration for extents in the secondary storage 106b. A workload concentration provides an extent to which the I/O activity, e.g., reads and/or writes, to an extent are concentrated in a particular storage region. In one embodiment the secondary extent activity ranking 304 is based on only the write activity to the primary storage 106a in embodiments where only writes to the primary storage 106a are mirrored to the secondary storage 106b. In alternative embodiments, different types of I/O operations may be used to determine the primary and secondary extent activity rankings.

The workload modeling information 300 further includes a computer renderable modeling information 306 document generated by the performance modeler 118 based on the primary 500a and secondary 500b workload concentration information, together with the primary storage extent activity ranking 202 (ranked according to read and writes) and the secondary storage extent activity ranking 304 (ranked according to writes only), to render a representation of a graph with the performance information to allow comparison of the workload concentration at different cumulative storage amounts for the primary 106a and secondary 106b extents. The computer renderable modeling information 306 may be coded in a computer language to render information in a browser or other program, such as Hypertext Markup Language (HTML), Extended Markup Language (XML), Portable Document Format (PDF), etc.

FIG. 4 illustrates an embodiment of an instance 400, of extent I/O information 400 for an extent in one of the primary 106a or secondary 106b storage, including an extent ID 402 identifying the extent, the storage location 404 in the storage 106a or 106b, a number of reads 406 to the extent, a number of writes 408, and an I/O workload percentage 410, which may be calculated by dividing the read and write workload for the extent by the total workload of all extents based on read and write I/O operations. For instance, the I/O workload percentage 410 for one extent 402 in the primary storage 106a may comprise the sum of the number of reads 406 and writes 408 for the extent 402 divided by the sum of the reads and writes for all extents in the primary storage 106a. The I/O workload percentage 410 for an extent 402 in the primary 106a and secondary storage 106b may be based on the number of reads 406 and writes 408. The storage used 412 comprises the amount of storage used by the extent 402. During mirroring operations, because only writes occur to the secondary storage 106b, the secondary I/O workload percentage 410 secondary is based on writes. However, in the event of a failover or switch over from the primary 106a to the secondary 106b storage, the secondary I/O workload percentage 410 is based on both reads and writes occurring at the secondary storage 106b.

FIG. 5 illustrates an embodiment of an instance 500, of the I/O workload concentration information 500a, 500b for an extent, as including an extent ID 502 of the extent for which the information applies; a storage 504 indicating an amount of storage used by the extent; a cumulative I/O workload 506 comprising the I/O workload to the extent 502 and cumulative I/O percentage workload for extents having higher I/O activity ranking than the extent 502; and a cumulative storage 508 comprising the storage 504 used by the extent 502 and the storage used by extents having a higher I/O activity ranking than the extent 502.

In one embodiment, the secondary extent activity ranking 304 may be determined from the write activity in the extent I/O information 400 for the primary storage 106a, because all writes to the extents in the primary storage 106a are transferred to the secondary controller 104b to mirror on the secondary storage 106b, so that write activity to the primary storage 106a would also comprise write activity to the secondary storage 106b. Techniques known in the art may be used to determine the activity ranking and storage tier assignment, wherein the primary extent activity ranking 202 and primary extent storage tier assignment 206 is based on both read 406 and writes 408 to extents in the primary storage 106a, and the secondary extent activity ranking 304 is based on only writes 408 to the primary storage 106a. In this way, the performance modeler 118 does not need to collect performance statistics from the secondary controller 104b and instead gathers data based on the writes to the primary storage 104a, which are written to the secondary storage 104b as part of the mirroring. In an alternative embodiment, the performance modeler 118 may obtain the secondary performance statistics, including the secondary extent activity ranking 304, from the secondary controller 104b.

The primary extent activity ranking 202 and the secondary extent activity ranking 304 may differ because the primary extent activity ranking 202 is based on both read and write activity and the secondary extent activity ranking 304 is based on only the writes to the primary storage 106b. Such differences may result in different storage tier assignments for the extents 206 in the primary 106a and secondary 106b storages.

Figure 6A:
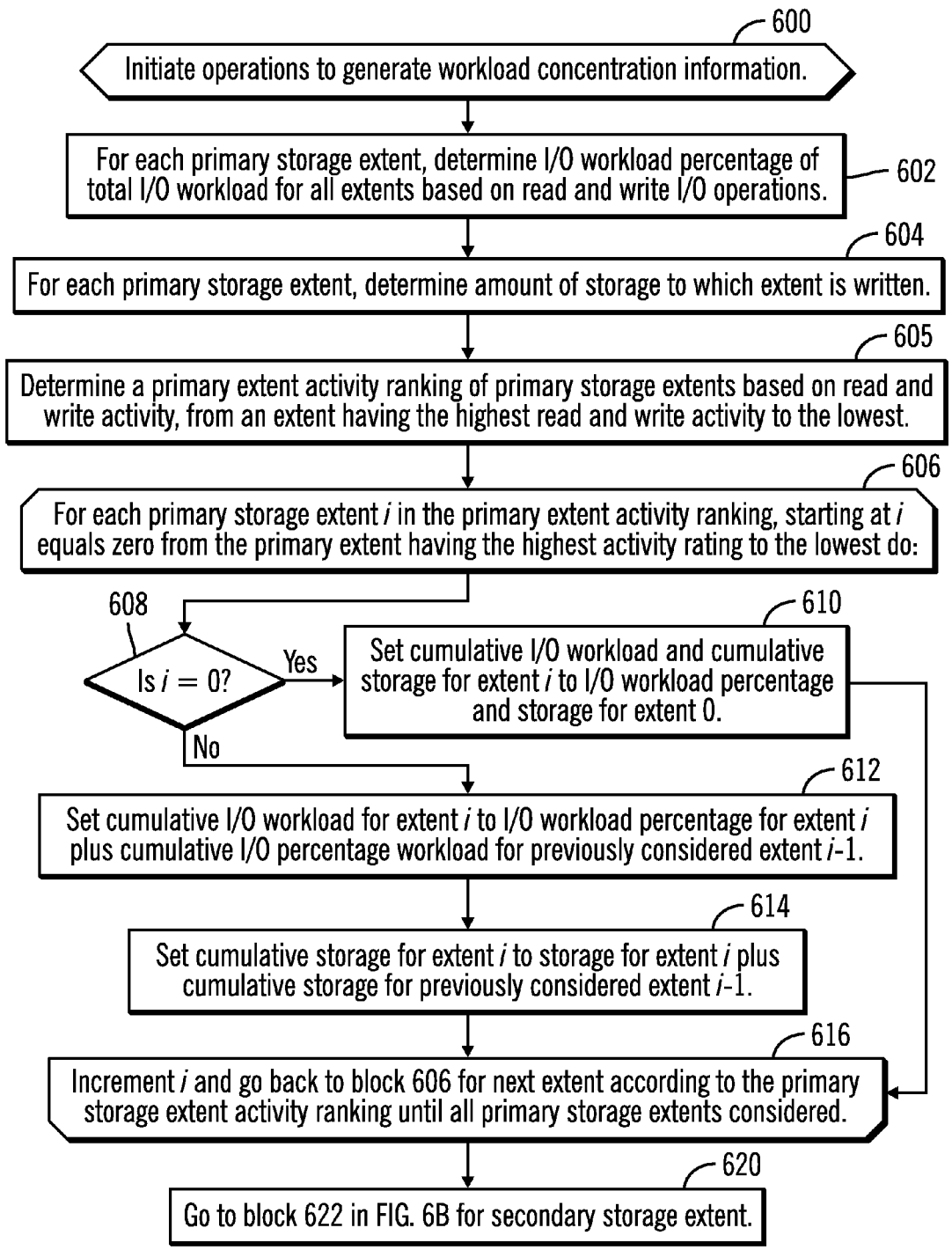
FIGS. 6a and 6b illustrate an embodiment of operations to generate workload concentration information.
Figure 6B:
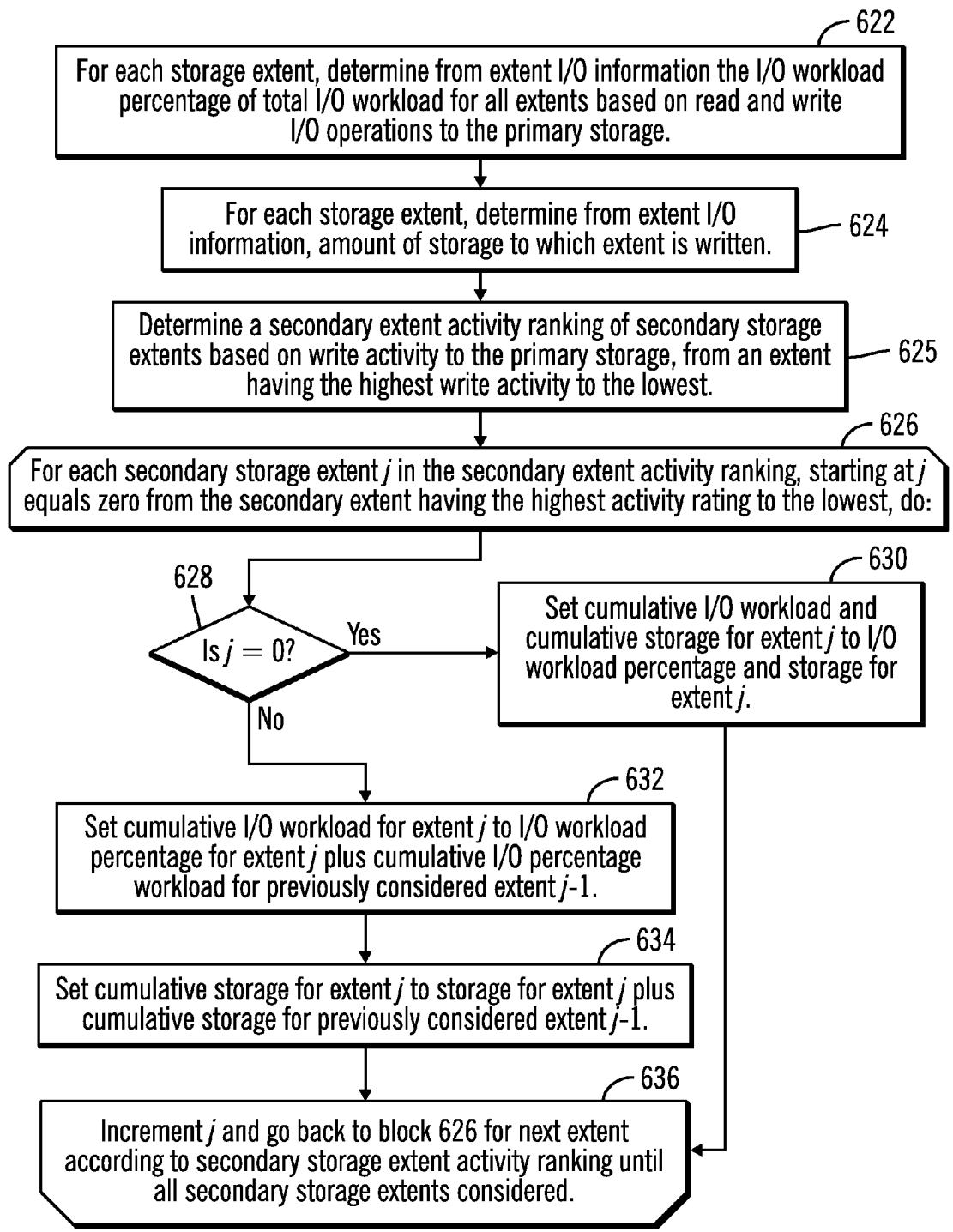

FIGS. 6a and 6b illustrate an embodiment of operations performed by the performance modeler 118 to model the I/O workload concentration and performance information for the primary 106a and secondary 106b storages. Upon initiating (at block 600) operations to model performance information, performance modeler 118 determines (at block 602) from the primary extent I/O information 400, for each primary storage extent in the primary storage 106a, the I/O workload percentage 410 by dividing the read and write workload for the extent by the total workload of all extents based on read and write I/O operations. For instance, the I/O workload percentage 410 for one extent 402 may comprise the sum of the number of reads 406 and writes 408 for the extent 402 divided by the sum of the reads and writes for all extents in the primary storage3 106a. The performance modeler 118 determines (at block 604) the amount of storage 412 used by each of the extents. The performance modeler 118 further determines (at block 605) a primary extent activity ranking 202 of primary storage extents based on read and write activity, from an extent having the highest read and write activity to the lowest. From blocks 606 through 616, a loop of operations is performed at blocks 608 through 614 for each primary storage extent i in the primary extent activity ranking 202, from a highest activity extent to a lowest activity extent, where i starts at 0 for the first highest activity extent being considered. If (at block 608) the highest activity extent is being considered, i.e., i=0, then the cumulative I/O workload 506 and cumulative storage for 508 for the highest activity extent 0 is set (at block 610) to the I/O workload percentage 410 and storage used 412 for the highest activity extent 0.

If (at block 608) i is not equal to 0, then the cumulative I/O workload 506 for extent i is set (at block 612) to the I/O workload percentage 410 for extent i plus cumulative I/O percentage workload 506 for the previously considered extent i−1. The cumulative storage 508 for extent i is set (at block 614) to storage used 412 for extent i plus the cumulative storage 508 for the previously considered extent i−1. After generating the primary workload concentration information 500a, control proceeds (at block 620) to block 622 in FIG. 6b to generate the secondary workload concentration information 500b.

The operations at blocks 622 through 636 comprise the operations performed at blocks 602 through 618 in FIG. 6a, but with respect to write only requests to the extents at the primary storage 106b to determine the secondary the secondary storage extent activity ranking 304 based on the assumption that all writes to the extents in the primary storage 106a are applied to the secondary storage 106b. The secondary workload concentration information 500b is calculated based on all the read and write I/Os to the primary storage 106a, because when the application is switched to run on the secondary storage in the case of failover, the secondary storage receives all the I/Os. In certain embodiments, it may be assumed that the read and writes to the primary 106a would be the same as to the secondary 106b.

Figure 7:
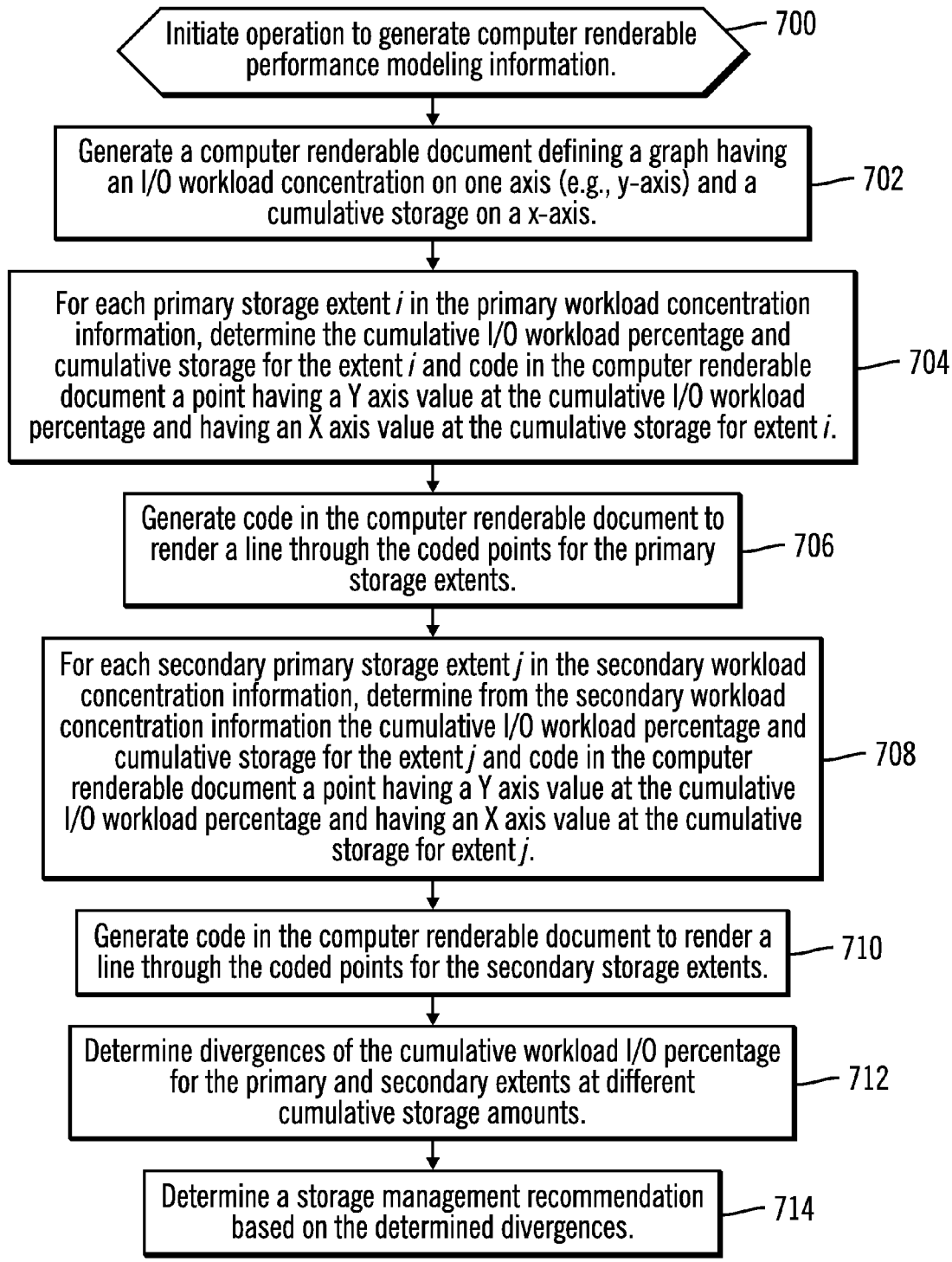
FIG. 7 illustrates an embodiment of operations to generate computer renderable performance modeling information.

FIG. 7 illustrates an embodiment of operations performed by the performance modeler 118 to generate the computer renderable modeling information 406 which may be transmitted to an administrator computer and browser (not shown) to render to use to make storage allocation decisions. Upon initiating (at block 700) the operation to generate the computer renderable modeling information 406, the performance modeler 118 generates (at block 702) a computer renderable document defining a graph having an I/O workload concentration percentage on one axis (e.g., Y-axis) and a cumulative storage on an X-axis. For each primary storage extent i in the primary workload concentration information 500a, the performance modeler 118 determines (at block 704) from the primary workload concentration information 500a the cumulative I/O workload percentage 506 and cumulative storage 508 for the extent i and codes in the computer renderable information 306 a point having a Y axis value at the determined cumulative I/O workload percentage 506 and having an X axis value at the cumulative storage 508 for extent i. The performance modeler 118 adds (at block 706) code in the computer renderable document to render a line through the coded points for the primary storage extents.

For each secondary storage extent j in the secondary workload concentration information 500b, the performance modeler 118 determines (at block 708) from the secondary workload concentration information 500b the cumulative I/O workload percentage 506 and cumulative storage 508 for the extent j and codes in the computer renderable document a point having a Y axis value at the cumulative I/O workload percentage and having an X axis value at the cumulative storage for extent j in the secondary storage 106b. The performance modeler 118 generates (at block 710) code in the computer renderable information 306 to render a line through the coded points for the secondary storage extents.

The performance modeler 118 may further analyze the information in the graph to make storage allocation suggestions. For instance, the performance modeler 118 may determine (at block 712) divergences of the cumulative workload I/O percentage for the primary and secondary extents at different cumulative storage amounts. The performance modeler 118 determines (at block 714) a storage management recommendation based on the determined divergences.

Figures 8A, 8B, 8C:
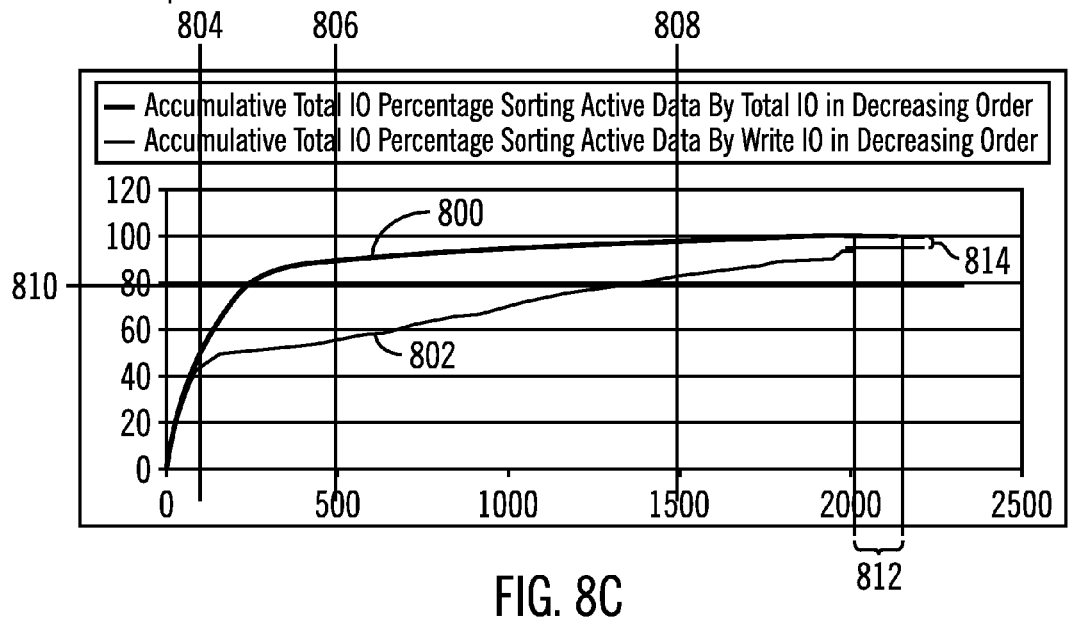
FIG. 8a illustrates an example of extent I/O information for the primary storage.
FIG. 8b illustrates an example of extent I/O information for the secondary storage.
FIG. 8c illustrates an example of a performance modeling chart based on a simulated customer workload.

FIG. 8a illustrates an example of read and write operations for extents e1, e2, and e3 ordered according to I/O activity, with the cumulative I/O workload percentages 506 based on the read and write operations to the extents in the primary storage 106a.

FIG. 8b illustrates an example of the read and write operations for the extents ordered with respect to I/O activity at the secondary storage 106b, which is modeled based on the writes to the primary storage 106a. The cumulative I/O workload percentage is shown, which is based on both the reads and writes to the primary storage extents. The I/O activity ordering of the secondary storage in FIG. 8b, e.g., e2, e1, e3, differs from that of the primary storage in FIG. 8a.

FIG. 8c provides an example of the performance graph, having a first line 800 showing the I/O workload concentration with respect to cumulative storage for read and writes to the primary storage, sorted according to I/O activity, and a second line I/O 802 showing I/O workload concentration with respect to cumulative storage for reads and writes to the primary storage 106a, sorted according to write I/O activity since the secondary storage 106b receives only writes.

According to the chart in FIG. 8c, at the vertical line 804, the I/O workload concentration for the primary storage and the secondary storage is the same for the extents on the first 100 GB and less of storage. That implies if less than 100 GB of faster storage drive is configured on both the primary and secondary storage devices, then if there is a failover of all the read and write activity to the secondary storage, there should be no workload change because the workload is the same at 100 GB or less of cumulative storage.

At the vertical line 806, the I/O workload concentration for the primary storage, on line 800, is about 90% of total IO, which is distributed on the most intensive 500 GB data while about 55% of total IO workload for the secondary storage is distributed on the most intensive 500 GB. This implies if 500 GB of faster storage drive is configured on both primary 106a and secondary 106b storages, then 90% of workload will be moved to the faster storage tier to optimize on the primary storage 106a, while only 55% of workload will be moved to faster storage tier to optimize on the secondary storage 106b. This means that if there is a failure at the primary storage 106a and the workload is switched over to the secondary storage 106b, 35% (90%-55%) of workload on the secondary storage 106b will be impacted.

The vertical line at 808, as with 806 about 95% of total IO is distributed on the most intensive 1500 GB data if the data is sorted by read and write I/O while about 85% of total IO is distributed on the most intensive 1500 GB of the secondary storage 106b when the data is sorted by write IO. This means that if the primary storage 106a were to fail and the workload switched over to the secondary storage 106b, 10% (95%-85%) of the secondary storage 106b workloads performance will be impacted by having to handle reads as well as writes.

Moving from 806 and 808 implies that expanding the fastest storage tier from 500 GB to 1500 GB can decrease the performance impacted workload from 35% to 10%.

In the graph model of FIG. 8c, horizontal line 810 shows how to decrease the workload impact on the secondary storage when the workload is switched from the primary storage 106a to the secondary storage 106b by allocating additional storage to the faster storage tier on the secondary storage 106b. For instance, to have the secondary storage 106b handle the I/O workload of the primary storage 106b at 500 gigabytes (GB), which is 80%, the horizontal line 810 shows that an additional 1300 GB of the fastest tier storage, e.g., SSDs, would have to be added to the secondary storage, so that if there is a failover from the primary 106a to the secondary 106b storage, the secondary storage 106b can handle 80% of the workload of the primary storage on the fastest storage tier.

Reference 812 shows the capacity whose workload is pure read, and this amount of data would be considered as completely inactive data on the secondary storage 106b while it can be active on the primary storage 106a. Reference 814 also shows how much of the workload that is pure read, as the pure read workload is considered as completely inactive data on the secondary storage 106b while it is active on the primary storage 106a.

Figure 9:
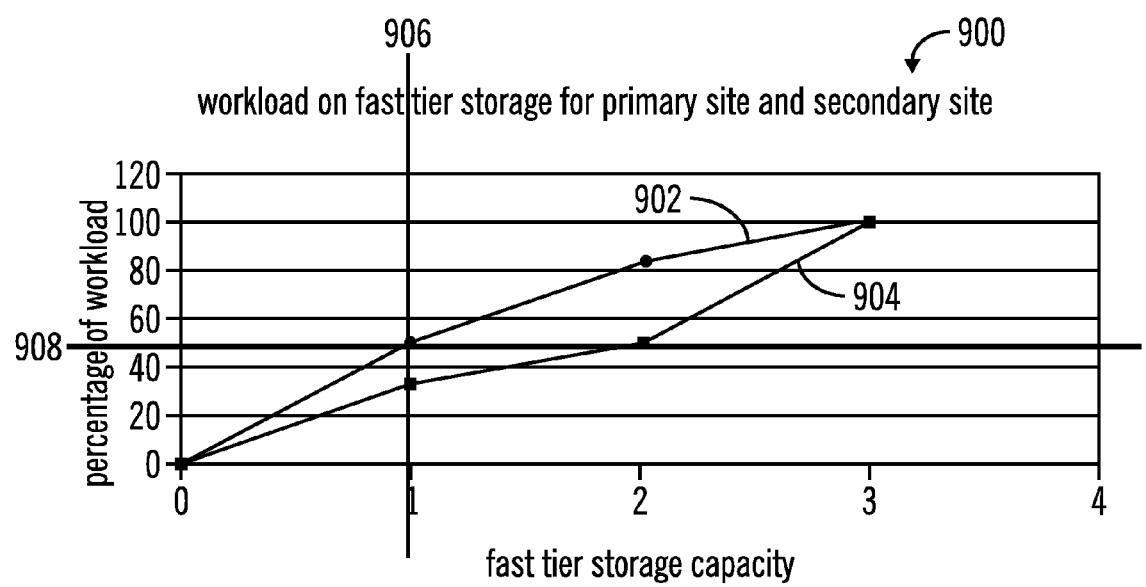
FIG. 9 illustrates a further example of a performance modeling chart based on the extent I/O information of FIGS. 8a and 8b.

FIG. 9 shows an additional graph 900 of cumulative I/O workload by extent or storage, which is based on the data in FIGS. 8a and 8b, and has line 902 show the workload for the primary site and line 904 for the secondary site. Reference 906 shows that the primary site will locate 50% of the total workload on the first 1 GB of fast tier storage while the secondary site will put 33.3% of the total workload on the first 1 GB of fast tier storage. Reference 908 shows that in order to put 50% of the total workload and on the fast tier storage, the primary site needs to configure 1 GB of fast tier storage, as shown on line 902, and the secondary site needs to configure 2 GB of storage as shown on line 904.

In alternative embodiments, the information of FIGS. 8c and 9 may be presented in different formats, such as table forms, descriptive text, columns of numbers, interactive graphs, etc.

With the above modeling information in the form of the charts, the administrator can determine how much storage is needed on the secondary storage 106b to satisfy the I/O workload in the highest storage tier if read and writes were to failover to the secondary storage 106b. The reason that more higher tier storage space needs to be allocated to the secondary storage 106b is that after the switch over or fail over, an extent on the secondary storage that had a lower activity ranking and may have been in a lower storage tier, will experience increased activity and an increased activity ranking due to receiving reads as well as writes and be migrated to a higher storage tier at the secondary storage. If the secondary storage 106b is not allocated additional space in the high storage tier, then there may not be sufficient space in the highest storage tier for that extent experiencing higher I/O activity due to the failover.

Described embodiments provide techniques to model the performance differentiation between a primary storage and a secondary storage in a data mirroring environment, where the storages have different storage tiers with extents allocated to tiers according to their level of I/O activity. Described embodiments calculate cumulative I/O workload concentration and cumulative storage for extents in the primary and secondary storages that are ordered according to their I/O activity to determine a workload concentration differentiation for different storage amounts that can be used to indicate an amount of additional higher performing storage that needs to be allocated to the higher storage tier in the secondary storage.

For instance, by analyzing the gap between the accumulative total workload concentration for the highest performing tier between the primary storage and secondary storage, the performance modeler 118 or an administrator viewing the graph, or numbers based on the graph, can ascertain the performance differentiation between primary storage and secondary storage at the highest performing storage tier. This performance differentiation can indicate the amount of highest performing storage to allocate to the highest storage tier at the secondary storage to maintain the workload concentration on the highest performing tier.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
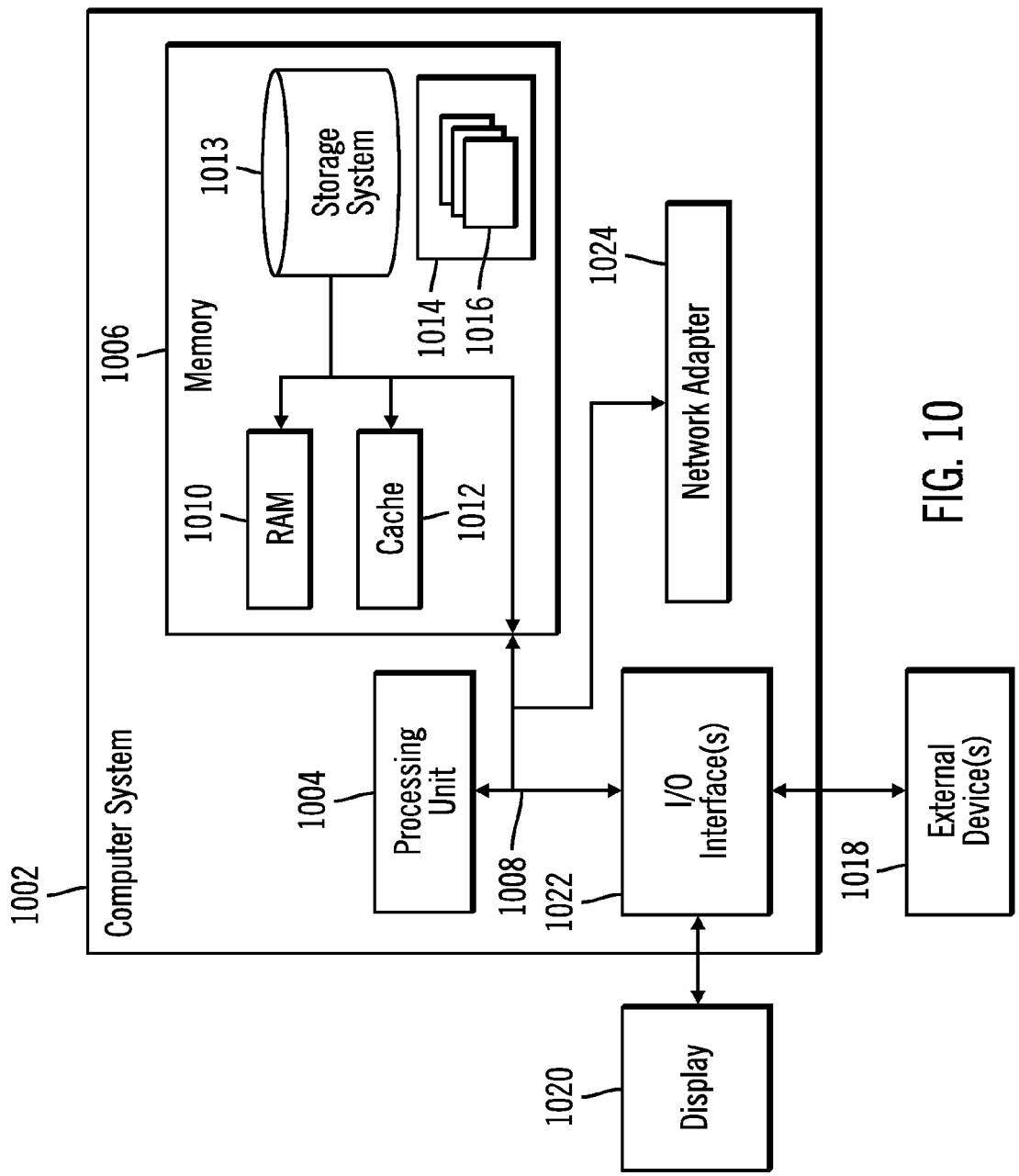
FIG. 10 illustrates an embodiment of a computing environment in which embodiments may be implemented.

FIG. 10 illustrates an embodiment of a computer system 1002 which may comprise an implementation of the controllers 104a, 104b. Computer node 1002 is only one example of a suitable computing node and is not intended to suggest any limitation as to the scope of use or functionality of embodiments of the invention described herein. Regardless, the computer node 1002 is capable of being implemented and/or performing any of the functionality set forth hereinabove.

The computer node 1002 is operational with numerous other general purpose or special purpose computing system environments or configurations. Examples of well-known computing systems, environments, and/or configurations that may be suitable for use with computer node 1002 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1002 may be described in the general context of computer system executable instructions, such as program modules, being executed by a computer system. Generally, program modules may include routines, programs, objects, components, logic, data structures, and so on that perform particular tasks or implement particular abstract data types. Computer node 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer node 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004.

Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1002 typically includes a variety of computer system readable media. Such media may be any available media that is accessible by computer node 1002, and it includes both volatile and non-volatile media, removable and non-removable media, and may be used for storing the programs and data used by the programs.

System memory 1006 can include computer system readable media in the form of volatile memory, such as random access memory (RAM) 1010 and/or cache memory 1012. Computer node 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules etc., and program data. Each of the operating system, one or more application programs, other program modules, and program data or some combination thereof, may include an implementation of a networking environment. Program modules 1016 generally carry out the functions and/or methodologies of embodiments of the invention as described herein.

Computer node 1002 may also communicate with one or more external devices 1018 such as a keyboard, a pointing device, a display 1020, etc.; one or more devices that enable a user to interact with the computer node 1002; and/or any devices (e.g., network card, modem, etc.) that enable computer system/server 1002 to communicate with one or more other computing devices. Such communication can occur via Input/Output (I/O) interfaces 1022. Still yet, computer node 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for generating, by a processor, storage information on a storage environment having a primary storage and a secondary storage, comprising:
   determining a first type and a second type of Input/Output (I/O) operations with respect to extents configured in the primary storage;
   determining cumulative I/O workloads for the primary storage based on the first type and the second type of I/O operations at different cumulative storage amounts of the primary storage indicating a concentration of the I/O workloads on the primary storage, wherein the primary storage includes multiple storage tiers;
   determining cumulative I/O workloads for the secondary storage based on the first type and the second type of I/O operations at different cumulative storage amounts indicating a concentration of the I/O workloads on the secondary storage, wherein the secondary storage includes multiple storage tiers;
   determining a performance gap based on the cumulative I/O workloads for the primary and secondary storages at one of the cumulative storage amounts;
   generating information on the determined performance gap; and
   using the information on the determined performance gap to determine an amount of storage to add to the secondary storage to maintain performance in an event that read and write operations at the primary storage are redirected to the secondary storage due to a failure of the primary storage.

2. The method of claim 1, wherein the first type of I/O operation comprises a write operation and the second type of I/O operation comprises a read operation, and wherein writes to the primary storage are written to the secondary storage.

3. The method of claim 1, wherein there are at least two storage tiers, a first storage tier comprising a higher performance tier than a second storage tier, wherein the using the information on the determined performance gap comprising using the information to determine an amount of the first storage tier to add to the secondary storage.

4. The method of claim 1, wherein generating the information comprises generating in a computer renderable file a chart having a first line showing the cumulative I/O workloads for the primary storage for different cumulative storage amounts at the primary storage and having a second line showing the I/O cumulative workloads for the secondary storage for different cumulative storage amounts at the secondary storage, wherein gaps between the first line and the second line at different cumulative storage amounts indicates performance gaps for those storage amounts if the I/O workloads of the primary storage were transferred to the secondary storages.

5. The method of claim 4, wherein the chart rendered in the computer renderable file shows that the cumulative I/O workloads for the primary storage are higher than the cumulative I/O workloads for the secondary storage at different cumulative storage amounts exceeding a specified storage amount at which the cumulative I/O workloads for the primary and secondary storages are substantially similar.

6. The method of claim 1, further comprising:
   determining a primary extent activity ranking for extents in the primary storage based on an I/O activity of the first and the second types of I/O operations with respect to the extents in the primary storage, wherein the I/O workloads percentages are based on I/O operations to extents ordered in the primary extent activity ranking, from a highest activity ranking to a lowest activity ranking; and
   determining a secondary extent activity ranking for extents in the secondary storage based on the I/O activity of only the first type of I/O operation with respect to the extents in the primary storage, wherein the I/O workloads are based on I/O operations to extents ordered according to the secondary extent activity ranking, from a highest activity ranking to a lowest activity ranking.

7. A system for generating storage information on a storage environment having a primary storage and a secondary storage, comprising:
   a processor; and
   a computer readable storage medium having computer readable program code embodied therein that when executed by the processor performs operations, the operations comprising:
      determining a first type and a second type of Input/Output (I/O) operations with respect to extents configured in the primary storage;

determining cumulative I/O workloads for the primary storage based on the first type and the second type of I/O operations at different cumulative storage amounts of the primary storage indicating a concentration of I/O workloads on the primary storage, wherein the primary storage includes multiple storage tiers;

determining cumulative I/O workloads for the secondary storage based on the first type and second type of I/O operations at different cumulative storage amounts indicating a concentration of I/O workloads on the secondary storage, wherein the secondary storage includes multiple storage tiers;

determining a performance gap based on the cumulative I/O workloads for the primary and secondary storages at one of the cumulative storage amounts;

generating information on the determined performance gap; and using the information on the determined performance gap to determine an amount of storage to add to the secondary storage to maintain performance in an event that read and write operations at the primary storage are redirected to the secondary storage due to a failure of the primary storage.

8. The system of claim 7, wherein the first type of I/O operation comprises a write operation and the second type of I/O operation comprises a read operation, and wherein writes to the primary storage are written to the secondary storage.

9. The system of claim 7, wherein there are at least two storage tiers, a first storage tier comprising a higher performance tier than a second storage tier, wherein the using the information on the determined performance gap comprises using the information to determine an amount of the first storage tier to add to the secondary storage.

10. The system of claim 7, wherein generating the information comprises generating in a computer renderable file a chart having a first line showing the cumulative I/O workloads for the primary storage for different cumulative storage amounts at the primary storage and having a second line showing the I/O cumulative workloads for the secondary storage for different cumulative storage amounts at the secondary storage, wherein gaps between the first line and the second line at different cumulative storage amounts indicates performance gaps for those storage amounts if the I/O workloads of the primary storage were transferred to the secondary storages.

11. The system of claim 10, wherein the chart rendered in the computer renderable file shows that the cumulative I/O workloads for the primary storage are higher than the cumulative I/O workloads for the secondary storage at different cumulative storage amounts exceeding a specified storage amount at which the cumulative I/O workloads for the primary and secondary storages are substantially similar.

12. The system of claim 7, wherein the operations further comprise:

determining a primary extent activity ranking for extents in the primary storage based on an I/O activity of the first and the second types of I/O operations with respect to the extents in the primary storage, wherein the I/O workload percentages are based on I/O operations to extents ordered in the primary extent activity ranking from a highest activity ranking to a lowest activity ranking; and determining a secondary extent activity ranking for extents in the secondary storage based on the I/O activity of only the first type of I/O operation with respect to the extents in the primary storage, wherein the I/O workload percentages are based on I/O operations to extents ordered in the secondary extent activity ranking from a highest activity ranking to a lowest activity ranking.

13. A computer program product for generating storage information on a storage environment having a primary storage and a secondary storage, the computer program product comprising a computer readable storage medium having computer readable program code embodied therein that when executed by a processor performs operations, the operations comprising:

determining a first type and a second type of Input/Output (I/O) operations with respect to extents configured in the primary storage;

determining cumulative I/O workloads for the primary storage based on the first type and the second type of I/O operations at different cumulative storage amounts of the primary storage indicating a concentration of the I/O workloads on the primary storage, wherein the primary storage includes multiple storage tiers;

determining cumulative I/O workloads for the secondary storage based on the first and the second types of I/O operations at different cumulative storage amounts indicating a concentration of the I/O workloads on the secondary storage, wherein the secondary storage includes multiple storage tiers;

determining a performance gap based on the cumulative I/O workloads for the primary and secondary storages at one of the cumulative storage amounts;

generating information on the determined performance gap; and using the information on the determined performance gap to determine an amount of storage to add to the secondary storage to maintain performance in an event that read and write operations at the primary storage are redirected to the secondary storage due to a failure of the primary storage.

14. The computer program product of claim 13, wherein the first type of I/O operation comprises a write operation and the second type of I/O operation comprises a read operation, and wherein writes to the primary storage are written to the secondary storage.

15. The computer program product of claim 13, wherein there are at least two storage tiers, a first storage tier comprising a higher performance tier than a second storage tier, wherein the using the information on the determined performance gap comprises using the information to determine an amount of the first storage tier to add to the secondary storage.

16. The computer program product of claim 1, wherein generating the information comprises generating in a computer renderable file a chart having a first line showing the cumulative I/O workloads for the primary storage for different cumulative storage amounts at the primary storage and having a second line showing the cumulative I/O workloads for the secondary storage for different cumulative storage amounts at the secondary storage, wherein gaps between the first line and the second line at different cumulative storage amounts indicate performance gaps for those cumulative storage amounts if the I/O workloads of the primary storage were transferred to the secondary storages.

17. The computer program product of claim 16, wherein the chart rendered in the computer renderable file shows that the cumulative I/O workloads for the primary storage are higher than the cumulative I/O workloads for the secondary storage at different cumulative storage amounts exceeding a specified storage amount at which the cumulative I/O workloads for the primary and secondary storages are substantially similar.

18. The computer program product of claim 1, wherein the operations further comprise:
  determining a primary extent activity ranking for extents in the primary storage based on an I/O activity of the first and the second types of I/O operations with respect to the extents in the primary storage, wherein the I/O workloads are based on I/O operations to extents ordered in the primary extent activity ranking from a highest activity ranking to a lowest activity ranking; and
  determining a secondary extent activity ranking for extents in the secondary storage based on the I/O activity of only the first type of I/O operation with respect to the extents in the primary storage, wherein the I/O workloads are based on I/O operations to extents ordered in the secondary extent activity ranking from a highest activity ranking to a lowest activity ranking.

19. The computer program product of claim 18, wherein the primary extent activity ranking of extents differs from the secondary extent activity ranking of extents resulting in different cumulative I/O workloads for the cumulative storage amounts for the primary and secondary storages.

20. The computer program product of claim 18, wherein the operations further comprise:
  assigning extents in the primary storage to storage tiers based on the primary extent activity ranking, wherein higher ranked extents are stored on relatively higher performing storage tiers; and
  assigning extents in the secondary storage to storage tiers based on the secondary extent activity ranking, wherein higher ranked extents are stored on relatively higher performing storage tiers.

\* \* \* \* \*